United States Patent [19]

Sensi

[11] 4,319,908
[45] Mar. 16, 1982

[54] FLOAT GLASS FORMING CHAMBER WITH A FLAT SLAB ROOF

[75] Inventor: John E. Sensi, Arnold, Pa.

[73] Assignee: PPG Industries, Inc., Pittsburgh, Pa.

[21] Appl. No.: 210,658

[22] Filed: Nov. 26, 1980

[51] Int. Cl.³ ........................................... C03B 18/16
[52] U.S. Cl. .................................................. 65/182.5
[58] Field of Search ................ 65/182.1, 182.3, 182.4, 65/182.5, 346

[56] References Cited

U.S. PATENT DOCUMENTS

| | | | |
|---|---|---|---|
| 3,248,203 | 4/1966 | Cunningham | 65/346 X |
| 3,584,477 | 6/1971 | Hainsfurther | 65/182.5 |
| 3,928,011 | 12/1975 | Schornhorst | 65/182.4 X |

Primary Examiner—Arthur D. Kellogg
Attorney, Agent, or Firm—Dennis G. Millman

[57] ABSTRACT

A float glass forming chamber is provided with a simplified roof structure comprised of suspended refractory slabs, whereby the number of joints and non-planar interior surfaces are reduced so as to suppress condensation and drippage of volatile materials within the chamber.

16 Claims, 6 Drawing Figures

FLOAT GLASS FORMING CHAMBER WITH A FLAT SLAB ROOF

BACKGROUND OF THE INVENTION

In the float process forming flat glass, molten glass is drawn from a melting furnace and passed to a forming chamber (or "float bath") where the molten glass is deposited onto an elongated pool of molten metal such as tin or copper or alloys thereof. There, a ribbon of glass is stretched to the desired thickness as it progresses along the elongated pool of molten metal and is then withdrawn from the forming chamber as a continuous ribbon at the exit end of the forming chamber. Because of the fluid support provided by the molten metal to the glass, glass of superior optical quality can be produced by the float process.

Unfortunately, a float glass forming chamber is not free from distortion producing effects. One such effect is the "drip" problem which is caused by dripping of molten droplets of metal or compounds thereof from the roof of the forming chamber onto the glass ribbon. Although the atmosphere within the float forming chamber is usually positively pressurized with an inert or reducing gas atmosphere, sulfur and oxygen are introduced into the chamber from the glass ribbon and from other sources, and these combine with the metal of the molten metal bath to form sulfides and oxides (e.g., tin sulfide and tin oxide) which volatilize and condense on relatively cool portions of the interior surface of the float chamber. The condensate accumulates on the structural members of the bath interior, and under certain temperature and chemical conditions will be reduced to elemental metal (e.g., tin), which eventually falls as droplets onto the glass ribbon. The impact of the metallic droplets on the soft glass ribbon produces indentations which appear as optical distortions in the final glass product. This defect is known variously as "tin drip," "crater drip," "top drip," or "tin speck."

It has now been found that the drippage problem is aggravated by the roof configuration conventionally employed in float forming chambers. The roof design commonly in use comprises a complex grid of relatively small ceramic pieces interlocked with one another and suspended from above by a large number of metallic rods. The design includes a large number of vertically extending electrical heating units supported within openings in the grid. Other openings in the grid are filled with blind plugs. The result is an interior roof surface which is non-planar and has a relatively large surface area and a large number of joints and vertically extending cracks and surfaces. Such a complex roof structure encourages condensation and dripping of volatilization products. The large number of crevices permits ingress of cooler exterior atmosphere which promotes condensation. The non-planar surfaces tend to increase running and coalescing of condensation products. More recent designs of float bath roofs have simplified the support grid design so as to extend across the float chamber in only the transverse direction for the sake of simplified construction. However, the revised design still possesses the drawbacks of a large number of joints and non-planar interior surfaces.

SUMMARY OF THE INVENTION

In the present invention, the roof of a float glass forming chamber is comprised of large slabs of refractory suspended from above, with a nearly planar, horizontal, interior surface which discourages the formation and dripping of condensed volatiles from the roof onto the glass ribbon. The slabs may be precast with openings for inserting heating elements through the roof. Preferably, a layer of loose insulating material is applied over the slabs which not only reduces heat loss, but also plugs joints around heating elements and between slabs. Compared to the conventional float chamber roof made of a large number of interlocking preformed ceramic pieces, the present invention reduces the total length of cracks in the roof substantially. Additionally, substantial portions, preferably the majority, of the interior surface of the chamber roof can be substantially horizontal and planar. Both of these features substantially reduce the sources of drippage.

THE DRAWINGS

FIG. 4 is a plan view of a portion of the roof exterior taken along line 4—4 in FIG. 1a.

DETAILED DESCRIPTION

Figure 1:
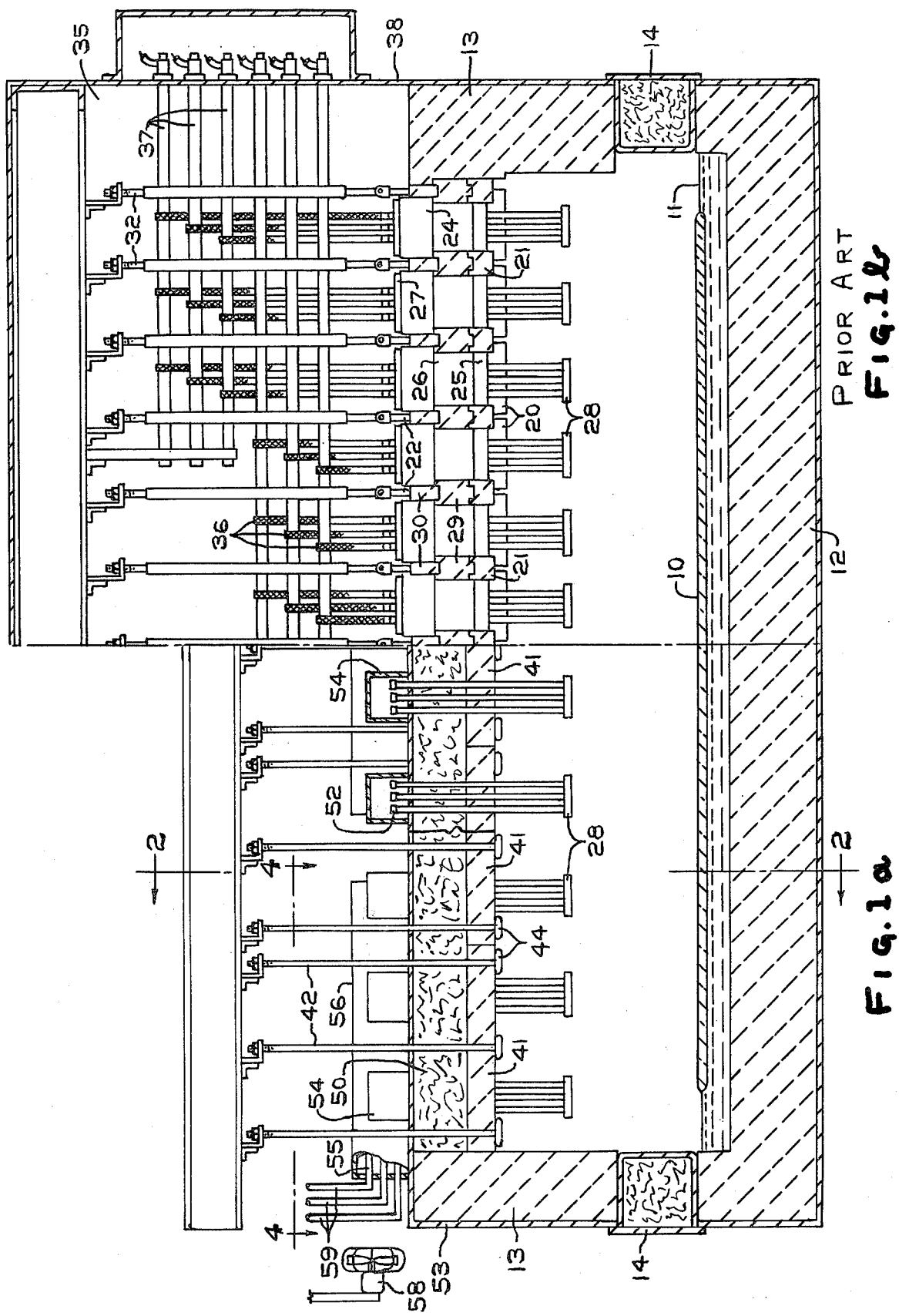
FIG. 1a is a transverse cross-sectional view of a preferred embodiment of a float glass forming chamber in accordance with the present invention.
FIG. 1b is a transverse cross-sectional view of a conventional prior art float glass forming chamber shown for comparison.

In FIG. 1a and FIG. 1b there is shown, side-by-side for comparison, float bath roof designs in accordance with a preferred embodiment of the present invention (FIG. 1a) and the conventional prior art float bath roof (FIG. 1b). In both, a ribbon of glass 10 being attenuated to the desired thickness floats on a pool of molten metal 11 (usually tin, although copper or mixtures of tin and copper may also be employed). Minor amounts of other metals such as iron may also be included in the molten metal bath. The metal bath is contained within a refractory vessel comprising a bottom 12 and side walls 13 having access openings that may be closed by means of side seals 14.

In the prior art roof arrangement as shown in FIG. 1b, the basic support grid comprises a large number of transversely extending support members 20 and longitudinally extending support members 21, both of which are preformed ceramic pieces. Vertically extending hanger rods 22 have hook-like members at their lower ends (not shown) which engage and interlock the ends of adjacent transverse support members 20. The longitudinal support members 21 span adjacent rows of the transverse support members 20 upon which they rest at opposite ends. The hanger rods 22 are, in turn, supported from above the rods 32 fastened at their upper ends to the overhead superstructure. The spacing between adjacent hanger rods both transversely and longitudinally in such a system is typically on the order of 30 centimeters or less. Into the rectangular openings in this grid are inserted a large number of heater elements, each of which consists of a sandwich of a plurality of pieces of refractory material 24, 25, 26, and 27 fastened together by means of vertically extending tie rods (not shown) and a vertically extending, three-legged, electrical resistance heating element 28 passing through the refractory pieces. The bottom refractory member 25 of the composite heating element overlaps and rests upon adjacent transverse support members 20. The spaces between the heating elements are filled with additional refractory members 29 and 30 which rest on the longitudinal support members 21 between the hangers 22. Heater elements are shown inserted into each of the grid openings in FIG. 1b as is the case in some zones of a conventional float chamber, but in other zones a particular cross-section may have some or even all of the openings filled with blind plugs rather than heater elements.

The prior art arrangement as shown in FIG. 1b employs a relatively large upper plenum chamber 35 to accommodate electrical connections to the heater elements. Each leg of the resistance heater elements 28 is connected at its upper end to a lead 36 which is, in turn, connected to a bus bar 37 in a three phase alternating current system. Because the float chamber is usually provided with an inert or reducing gas atmosphere, the entire chamber, including the upper plenum, is enclosed in a metal casing 38 to make the structure essentially gas-tight. To prevent oxidation of and to cool the electrical connections within the upper plenum 35, the inert or reducing gas atmosphere is usually fed to the upper plenum 35 from which it passes into the main forming chamber through joints in the roof structure. This infusion of relatively cool gases through the roof structure is also believed to have a detrimental effect on the problem of drippage from the roof.

Figure 2:
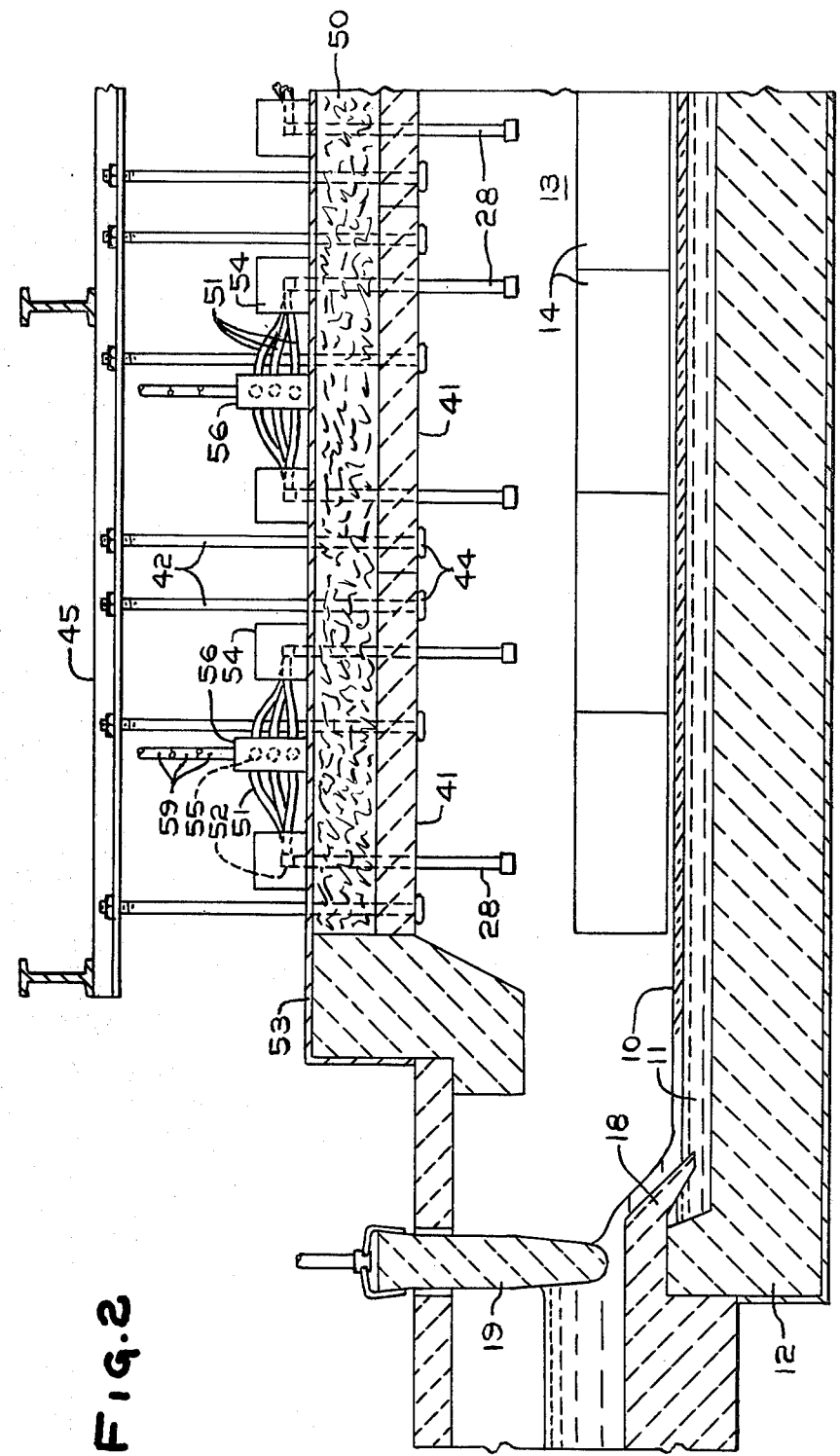
FIG. 2 is a longitudinal cross-section taken along line 2—2 in FIG. 1a of a preferred embodiment of a float glass forming chamber in accordance with the present invention.
Figure 3:
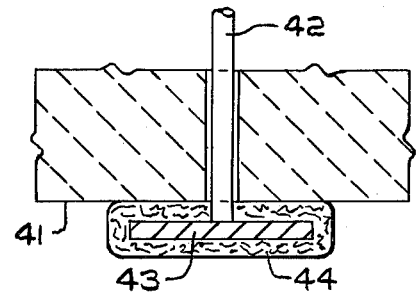
FIG. 3 is an enlarged cross-sectional view of a portion of a roof slab, showing details of a preferred hanger arrangement.
Figure 4:
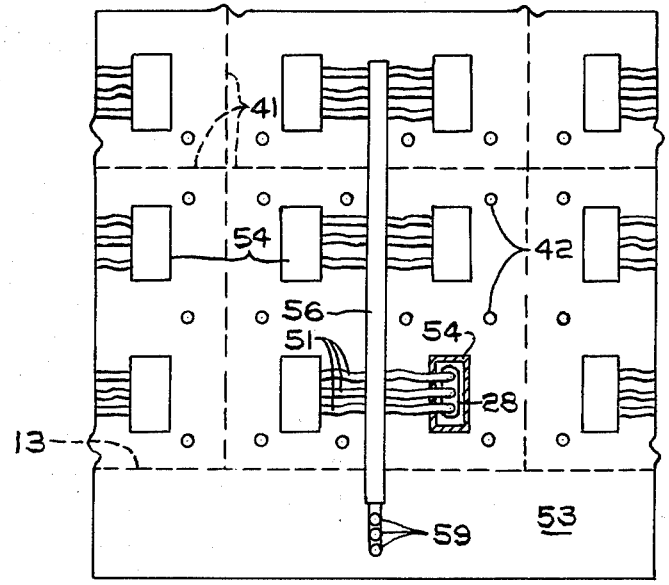

A preferred embodiment of the float chamber roof of the present invention may be seen in FIG. 1a and FIG. 2. Also, in FIG. 2 there may be seen a typical inlet to a float chamber where molten glass is delivered between a threshold 18 and a metering gate or "tweel" 19 onto the molten metal 11 of the float forming chamber. A novel aspect of the invention includes a roof structure in the form of a plurality of flat slabs 41 presenting an essentially horizontal, planar bottom surface to the interior of the float chamber. Such a slab may comprise a joint-free section of the roof much larger than those in a conventional float chamber roof. A slab 41 typically may have at least one horizontal dimension on the order of about one half meter or more, preferably about one meter. A horizontal area of at least about one half square meter, preferably at least one square meter, is typical. The actual size of a slab will depend upon the particular refractory being used, the geometry and thickness of the slab, and the operating conditions to which the slab will be exposed. While the maximum benefit would appear to be attained from the use of the maximum sized slab throughout the float chamber, the float chamber roof advantages may be obtained by employing the roof structure of the present invention in only portions of a float chamber, particularly in areas where drippage may be concentrated. Furthermore, constructional expediencies may require that slabs of less than the maximum area be employed in portions of the roof. Although rectangular slabs are shown in the drawings, it should be apparent that the slabs could have any shape in order to conform to any irregularities of the forming chamber structure or to accommodate any ancillary equipment.

The roof slabs 41 may be supported from above by any suitable hanger arrangement. In the depicted embodiment, each slab is supported by a plurality of vertically extending rods 42, each of which extends through the slab and is affixed at its lower end to a horizontal plate 43 on which the weight of the slab rests. The plate 43 may be covered with a layer of refractory material 44 to protect the plate from the high temperature environment in the interior of the float chamber. The refractory layer 44 may, for example, be a wrapping of alumina-silica fiber paper such as that sold under the name "Fiberfrax" by Carborundum Company, Niagara Falls, N.Y. A layer of the same type of refractory paper may be inserted between the slabs 41 to help seal the joints therebetween. The rods 42 and plates 43 are preferably made of stainless steel due to the high temperature environment. Each of the rods 42 is affixed at its upper end to a suitable overhead structural member 45.

The insulating value of the roof may be increased by applying a layer of insulating material 50 over the refractory slabs 41. This insulating material is preferably a loose material which may be packed around the rods 42 and heating elements 28 which extend through the roof slabs 41. A suitable material is "Fiberfrax" tamping mix sold by Carborundum Company, Niagara Falls, N.Y., and which is comprised of high temperature mineral wool. The insulating layer 50 also serves to plug the joints around the refractory slabs 41. By selecting the thickness of the insulating layer, the heat flux through the roof may be established, and by employing different thicknesses in different areas some control over the cooling pattern of the glass ribbon can be achieved. Furthermore, when the insulation is a loose material, altering the heat flux pattern of the roof is made relative simple by adding or removing some of the insulation. The use of a loose insulation material is also advantageous because of its flexibility, which avoids the danger of cracking during heat-up, and any gaps which may open can be filled easily with additional insulation. Additionally, because the loose insulation can be removed easily, removing or inserting heating elements, coolers, or measuring devices is expedited.

The heating elements 28 employed in connection with the present invention may be the same three-legged, three phase electric resistance heaters employed in conventional float chambers. The heating elements 28 may extend vertically through holes bored through or cast into the refractory slabs 41 and may extend above the roof structure where they may be attached to electrical leads 51 by means of clamps 52.

The prior art bus bar arrangement, as shown in FIG. 1b, may be employed for making electrical connections to the heating elements in conjunction with the roof design of the present invention. However, in the preferred embodiment shown in the drawings, the large plenum space 35 above the roof and the complex arrangement of bus bars in the prior art arrangement have been eliminated. This embodiment is the subject matter of co-pending U.S. application Ser. No. 209,636 filed on Nov. 24, 1980 by John E. Sensi and entitled "Float Glass Forming Chamber with Low Profile Roof." In that embodiment, the float chamber is maintained gas-tight by a metal casing 53 which extends across the chamber roof with essentially no space between the casing and the refractory material of the roof. Alternatively, the gas-tight casing may comprise a glaze applied to the surface of the insulating layer 50. Sodium silicate ("water glass") forms a suitable glaze when applied as a liquid to the surface. The use of a glaze further increases the adaptability of the roof structure since modifications to the heating elements or instrumentation can be carried out by merely breaking an area of the glaze, and then reglazing the area after the modification has been completed.

The upper ends of the heating elements 28 extend through the casing 53 and are enclosed by individual gas-tight housings 54. The housings 54 serve to contain within the forming chamber the inert or reducing gas atmosphere that may escape along the legs of the heating elements. A housing 54 may encompass the connections of more than one heating element, but it is preferred to minimize the size of the housings 54. Electrical conductor leads 51 are connected at one end to the upper ends of the heating element legs by means of clamps 52, and at the opposite ends to bus bars 55. The bus bars 55 are preferably located outside the housings 54 to permit the housings to be compact. Separate enclosures 56 may be provided for the bus bars, if desired, primarily for the sake of safety. Heavy cables 59 extend from the enclosures 56 to a main power source.

Figure 5:
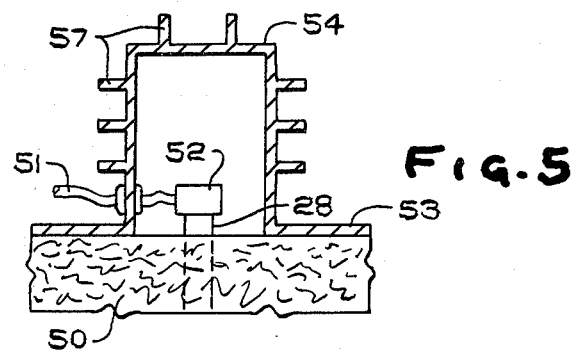
FIG. 5 is a cross-sectional view of an embodiment of a housing for electrical heater connections having cooling fins.

By thus minimizing the size of housings 54, the bulk of the enclosure above the float chamber roof is reduced, thereby providing freer access for maintenance and revision. Furthermore, by employing a large number of relatively small housings, cooling of the electrical connections is facilitated since air is free to circulate among the housings, and the housings present a large heat transfer area. Additional enhancement of heat transfer from the housings 54 may be achieved by providing cooling fins 57 on the exterior of the housings as shown in FIG. 5. Additionally, cooling may be improved by forced circulation of air about the housings, such as by fan means 58 as shown in FIG. 1a. Also, water-cooled heat exchange means may be provided on or near the housings for even greater cooling capacity.

A specific preferred embodiment has been described in detail for the sake of illustrating the invention and for disclosing the best mode, but it should be understood that other variations and modifications, as are known to those of skill in the art, may be resorted to without departing from the scope of the invention as defined by the claims which follow.

I claim:

1. An apparatus for producing flat glass by the float process comprising an elongated enclosure adapted to hold a pool of molten metal, means for delivering a stream of molten glass into the enclosure onto the molten metal, and means for drawing the glass along the length of the enclosure and for withdrawing the glass from the enclosure as a formed ribbon, the improvment comprising: a substantial portion of the roof of the enclosure being constructed of a plurality of substantially horizontally extending refractory slabs abutting one another, each slab having a substantially planar bottom surface facing the interior of the enclosure, and means for supporting the slabs.

2. The apparatus of claim 1 wherein the planar bottom surfaces of the slabs abut one another.

3. The apparatus of claim 2 wherein the planar bottom surfaces lie in a substantially common horizontal plane.

4. The apparatus of claim 1 wherein the means for supporting the slabs extend vertically from engagement with the slabs to overhead structural members.

5. The apparatus of claim 4 wherein the means for supporting the slabs comprise rods extending through the slabs, and the lower ends of the rods engage anchor elements upon which the slabs rest.

6. The apparatus of claim 5 wherein the anchor elements comprise a horizontally extending plate affixed to the end of each rod.

7. The apparatus of claim 1 wherein at least some of the slabs include openings through which heating elements are inserted.

8. The apparatus of claim 7 wherein at least some of the slabs include a plurality of said openings in each.

9. The apparatus of claim 1 wherein each slab has a horizontal dimension at least 0.5 meter long.

10. The apparatus of claim 1 wherein each slab has a horizontal area of at least 0.5 square meter.

11. The apparatus of claim 1 wherein the planar bottom surfaces of the slab comprise a majority of the interior surface area of the roof of the enclosure.

12. The apparatus of claim 1 wherein substantially the entire interior roof area of the enclosure is comprised of the slabs.

13. The apparatus of claim 1 wherein a layer of insulation overlies the slabs and a gas-tight casing covering the insulation.

14. The apparatus of claim 1 wherein the gas-tight casing is comprised of metal sheeting.

15. The apparatus of claim 1 wherein essentially no space is provided between the casing and the insulation layer.

16. The apparatus of claim 15 wherein the casing is comprised of a glaze on the insulation layer.

* * * * *